US012142851B2

(12) United States Patent
Rogers

(10) Patent No.: US 12,142,851 B2
(45) Date of Patent: Nov. 12, 2024

(54) LOW-PROFILE CIRCULARLY-POLARIZED ANTENNA

(71) Applicant: Raytheon Company, Waltham, MA (US)

(72) Inventor: John E. Rogers, Owens Cross Roads, AL (US)

(73) Assignee: Raytheon Company, Tewksbury, MA (US)

( * ) Notice: Subject to any disclaimer, the term of this patent is extended or adjusted under 35 U.S.C. 154(b) by 0 days.

(21) Appl. No.: 17/663,489

(22) Filed: May 16, 2022

(65) Prior Publication Data

US 2023/0369766 A1 Nov. 16, 2023

(51) Int. Cl.

*H01Q 9/04* (2006.01)
*H01Q 1/40* (2006.01)
*H01Q 1/52* (2006.01)

(52) U.S. Cl.

CPC ............. *H01Q 9/0435* (2013.01); *H01Q 1/40* (2013.01); *H01Q 1/521* (2013.01); *H01Q 9/0471* (2013.01)

(58) Field of Classification Search

CPC ...... H01Q 1/2283; H01Q 9/0435; H01Q 1/40; H01Q 1/521; H01Q 9/0471; H01Q 9/0407; H01Q 9/0457

See application file for complete search history.

(56) References Cited

U.S. PATENT DOCUMENTS

| | | | | |
|---|---|---|---|---|
| 4,835,538 | A | 5/1989 | McKenna et al. | |
| 4,943,809 | A * | 7/1990 | Zaghloul .............. | H01Q 9/0457 343/700 MS |
| 5,231,406 | A | 7/1993 | Sreenivas | |
| 5,400,040 | A | 3/1995 | Lane et al. | |
| 5,406,292 | A | 4/1995 | Schnetzer et al. | |
| 5,896,107 | A | 4/1999 | Huynh | |
| 6,133,882 | A | 10/2000 | LaFleur et al. | |

(Continued)

FOREIGN PATENT DOCUMENTS

| | | | |
|---|---|---|---|
| AU | 3838999 | A | 11/1999 |
| CN | 108717996 | A | 10/2018 |

(Continued)

OTHER PUBLICATIONS

Carver et al., "Microstrip Antenna Technology;" Proceedings of IEEE Transactions on Antennas and Propagation, vol. AP-29, No. 1; Jan. 1981; 23 Pages.

(Continued)

*Primary Examiner* — David E Lotter
*Assistant Examiner* — Aladdin Abdulbaki

(57) ABSTRACT

Described herein is an apparatus and a method for a low-profile, circularly polarized antenna. The antenna comprises a first substrate having a first side and a second side; an antenna element on the first side of the first substrate; a first conductor on the second side of the first substrate proximity coupled to the antenna element; a second conductor on the second side of the first substrate proximity coupled to the (Continued)

antenna element and ±90 degrees out of phase with the first conductor; a second substrate under the first substrate having a least one air gap therein under the antenna element; a third substrate under the second substrate having a first side and a second side; and an electrical ground plane on the second side of the third substrate.

14 Claims, 19 Drawing Sheets

(56) References Cited

U.S. PATENT DOCUMENTS

| | | | | |
|---|---|---|---|---|
| 6,359,588 | B1 | 3/2002 | Kuntzsch | |
| 7,636,063 | B2 | 12/2009 | Channabasappa | |
| 10,186,778 | B2 | 1/2019 | Zemliakov | |
| 10,978,812 | B2 | 4/2021 | Jain et al. | |
| 11,177,571 | B2 | 11/2021 | Liu et al. | |
| 2006/0044189 | A1 | 3/2006 | Livingston et al. | |
| 2007/0126638 | A1* | 6/2007 | Channabasappa | H01Q 9/0407 |
| 2016/0365632 | A1* | 12/2016 | Lee | H01Q 9/0442 |
| 2017/0133756 | A1 | 5/2017 | Eastburg et al. | |
| 2018/0219281 | A1 | 8/2018 | Sudo et al. | |
| 2020/0067191 | A1* | 2/2020 | Rogers | H01Q 9/045 |
| 2020/0303820 | A1 | 9/2020 | Jang et al. | |
| 2022/0006185 | A1* | 1/2022 | Yetisir | H01Q 9/0414 |
| 2022/0070997 | A1* | 3/2022 | Clark | H01P 3/08 |

FOREIGN PATENT DOCUMENTS

| | | | |
|---|---|---|---|
| CN | 111262022 | A | 6/2020 |
| WO | WO 2009/037716 | A2 | 3/2009 |

OTHER PUBLICATIONS

Papapolymerou et al., "Micromachined Patch Antennas;" Proceedings of IEEE Transactions on Antennas and Propagation, vol. 46, No. 2; Feb. 1998; 9 Pages.
Pozar, "Microstrip Antenna Aperture-Coupled to a Microstripline;" Article from Electronics Letters, vol. 21, No. 2; Jan. 17, 1985; 2 Pages.
Pozar et al., "Increasing the Bandwidth of a Microstrip Antenna by Proximity Coupling;" Article from Electronics Letters, vol. 23, No. 8; Apr. 9, 1987; 2 Pages.
Wood, "Improved Bandwidth of Microstrip Antennas Using Parasitic Elements;" Proceedings of IEEE Antennas and Propagation Society International Symposium 1992 Digest; Jun. 18-25, 1992; 4 Pages.

* cited by examiner

LOW-PROFILE CIRCULARLY-POLARIZED ANTENNA

BACKGROUND

Conventional systems utilize antennas to transmit/receive signals to/from their environment for communication systems (i.e., data link, telemetry, flight termination, global positioning system (GPS)). Some systems have constrained internal space for communications systems including antennas (whose size depends on an operating frequency band).

SUMMARY

In accordance with the concepts described herein, exemplary low-profile, circularly-polarized antenna devices and methods provide antennas capable of conforming to systems with low profiles such that the antennas are not invasive to a payload volume.

In accordance with the concepts described herein, exemplary low-profile, circularly-polarized antenna devices and methods provide a radome material to protect an antenna element and one or more parasitic patches from an environment (e.g., temperature, corrosion, etc.).

In accordance with the concepts described herein, exemplary low-profile, circularly-polarized antenna devices and methods provide a patch antenna element residing under one or more parasitic patches.

In accordance with the concepts described herein, exemplary low-profile, circularly-polarized antenna devices and methods provide two microstrip feed lines residing below a patch antenna element.

In accordance with the concepts described herein, exemplary low-profile, circularly-polarized antenna devices and methods provide a power divider (e.g., combiner) with an approximately +/−90 degree phase line with two outputs connected to two microstrip feed lines.

In accordance with the concepts described herein, exemplary low-profile, circularly-polarized antenna devices and methods provide an air gap residing below a patch antenna element.

In accordance with the concepts described herein, exemplary low-profile, circularly-polarized antenna devices and methods provide an electrical ground plane residing below microstrip feed lines.

DESCRIPTION OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which.

DETAILED DESCRIPTION

The present disclosure provides exemplary low-profile, light-weight, conformal, and circularly-polarized antenna devices and methods.

In an exemplary embodiment, low-profile, circularly-polarized antenna devices and methods use a proximity coupled feed line to simplify fabrication (e.g., no vias), reduce manufacturing costs (e.g., no vias), eliminate a point of failure while conformed (e.g., due to stressed vias), and increase bandwidth due to improved component matching.

In an exemplary embodiment, low-profile, circularly-polarized antenna devices and methods include an air cavity below an antenna element to improve antenna gain and bandwidth. In an exemplary embodiment, low-profile, circularly-polarized antenna devices and methods include parasitic patches electrically coupled to, and residing above, an antenna element to improve antenna bandwidth.

In an exemplary embodiment, low-profile, circularly-polarized antenna devices and methods include two phase-shifted feed lines to induce circular polarization. In an exemplary embodiment, low-profile, circularly-polarized antenna devices and methods, a proximity coupled patch is employed in conformal applications to get better bandwidth, easier fabrication, and better operation on conformal surfaces as compared to antennas that include vias. In an exemplary embodiment, low-profile, circularly-polarized antenna devices and methods include a proximity coupled patch with two feed lines for circular polarization, with a cavity below the patch for improved gain/bandwidth, with parasitic patches for further improved bandwidth, where either dielectric materials or magnetic materials are used. A low-profile, circularly-polarized antenna device and method using magnetic materials greatly reduce the size for lower frequency applications.

In an exemplary embodiment, low-profile, circularly-polarized antenna devices and methods, dielectric materials may have thicknesses 00 mil. In an exemplary embodiment, the dielectric material may be clad in a conductive material (e.g., copper) on either one side or both sides. In an exemplary embodiment, copper may be pressed to a dielectric material using pressure and heat. In an exemplary embodiment, a thickness of copper may be controlled to either ½ oz (17 mil), 1 oz (34 mil), or 2 oz (68 mil). For most applications 1/2 oz copper is sufficient, but in some higher power applications 1 oz or 2 oz is used.

Figure 1:
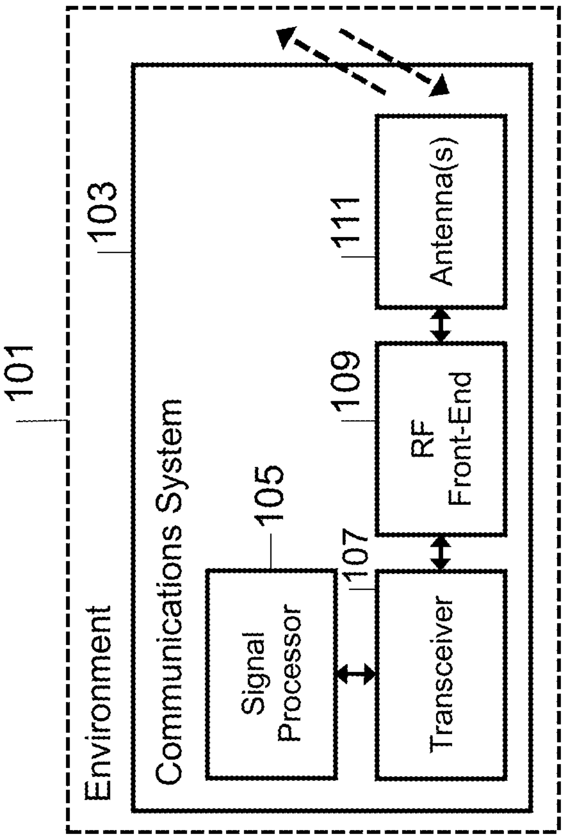
FIG. 1 is an illustration of an exemplary embodiment of an antenna environment.

FIG. 1 is an illustration of an exemplary embodiment of an antenna environment 101. In the exemplary embodiment, the environment 101 comprises a communication system 103 comprising a signal processor 105, a transceiver 107, a radio frequency (RF) front-end 109, and at least one antenna 111.

In the exemplary embodiment, the signal processor 105 comprises a bidirectional input/output connected to the transceiver 107. The transceiver 107 comprises a first bidirectional input/output connected to the signal processor 105 and a second bidirectional input/output connected to the RF front-end 109. The RF front-end 109 comprises a first bidirectional input/output connected to the transceiver 107 and a second bidirectional input/output connected to the at least one antenna 111. The at least one antenna 111 comprises a bidirectional input/output connected to the RF front-end 109.

Figure 2:
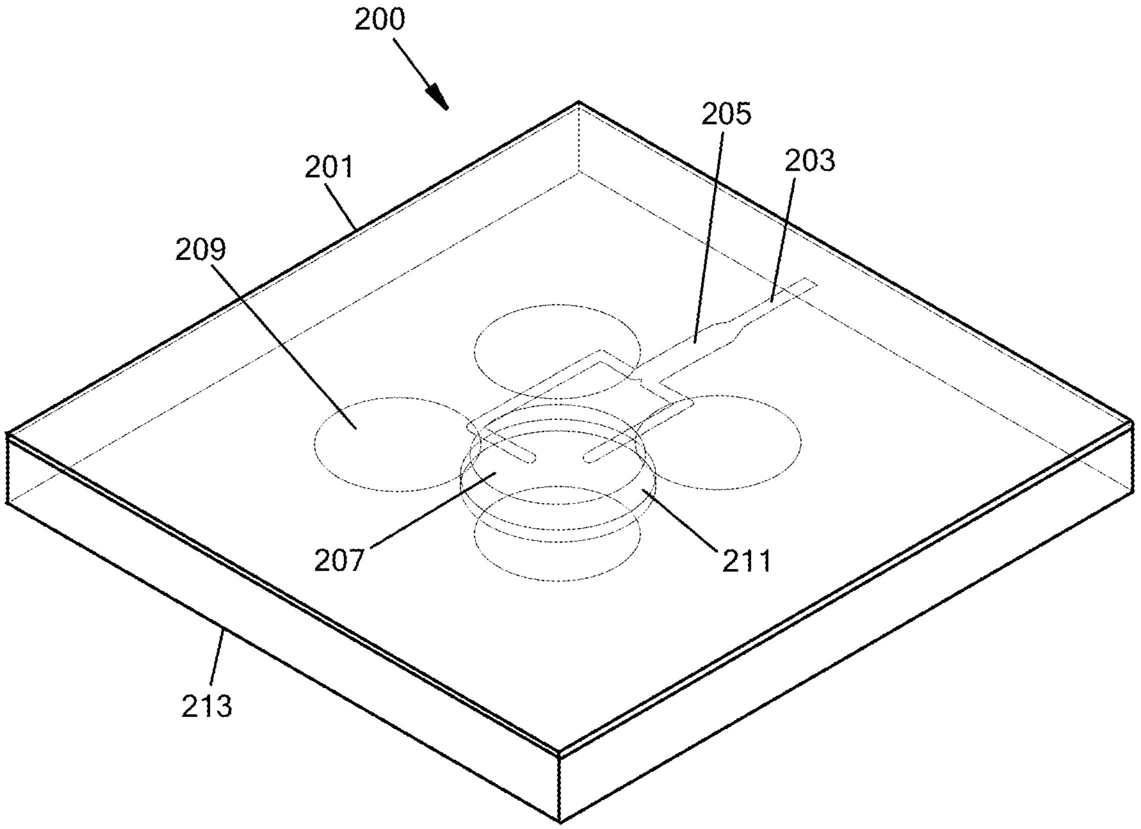
FIG. 2 is an illustration of an exemplary embodiment of a low-profile, circularly-polarized antenna.

FIG. 2 is an illustration of an exemplary embodiment of low-profile, circularly-polarized antenna 200. In the exemplary embodiment, the low-profile, circularly-polarized antenna 200 comprises a radome 201, a microstrip feed line 203, a power divider 205, a patch antenna element 207, at least one parasitic patch element 209, at least one air cavity 211, and an electrical ground plane 213.

In the exemplary embodiment, the radome 201 is formed from a first dielectric material. The at least one parasitic patch element 209 is formed on a second dielectric layer below the first dielectric material. FIG. 2 illustrates four circular parasitic patch elements 209. However, the present disclosure is not limited to four parasitic patch elements 209 or circular parasitic patch elements.

The patch antenna element 207 is formed on a top side of a third dielectric material and below the at least one parasitic patch element 209. The microstrip feed line 203 is formed on a bottom side of the third dielectric material and below the patch antenna element 207. The power divider 205 is formed on the bottom side of the third dielectric material and is configured to divide the microstrip feed line 203 into two microstrip feed lines that are approximately ±90 degrees out of phase with each other and proximity-coupled to the patch antenna element 207 to circularly-polarize the patch antenna element 207. In an exemplary embodiment, the power divider 205 may be a T-junction power divider, a Wilkinson power divider, or a ±90 degree hybrid coupler.

The at least one air cavity 211 is formed in a fourth dielectric material below the patch antenna element 207. FIG. 2 illustrates one air cavity. However, the present disclosure is not limited to one air cavity. The electrical ground plane 213 is formed on a fifth dielectric material below the fourth dielectric material. In the exemplary embodiment, the dielectric materials may be formed using a printed circuit board (PCB) process, a semiconductor process, or a three dimensional (3D) printing process. In the PCB process, the first through fifth dielectric materials are bonded to each other using an adhesive. In the semiconductor process and the 3D printing process the first through fifth dielectric materials are inherently bonded to each other by virtue of the semiconductor process and the 3D printing process, respectively.

Figure 3:
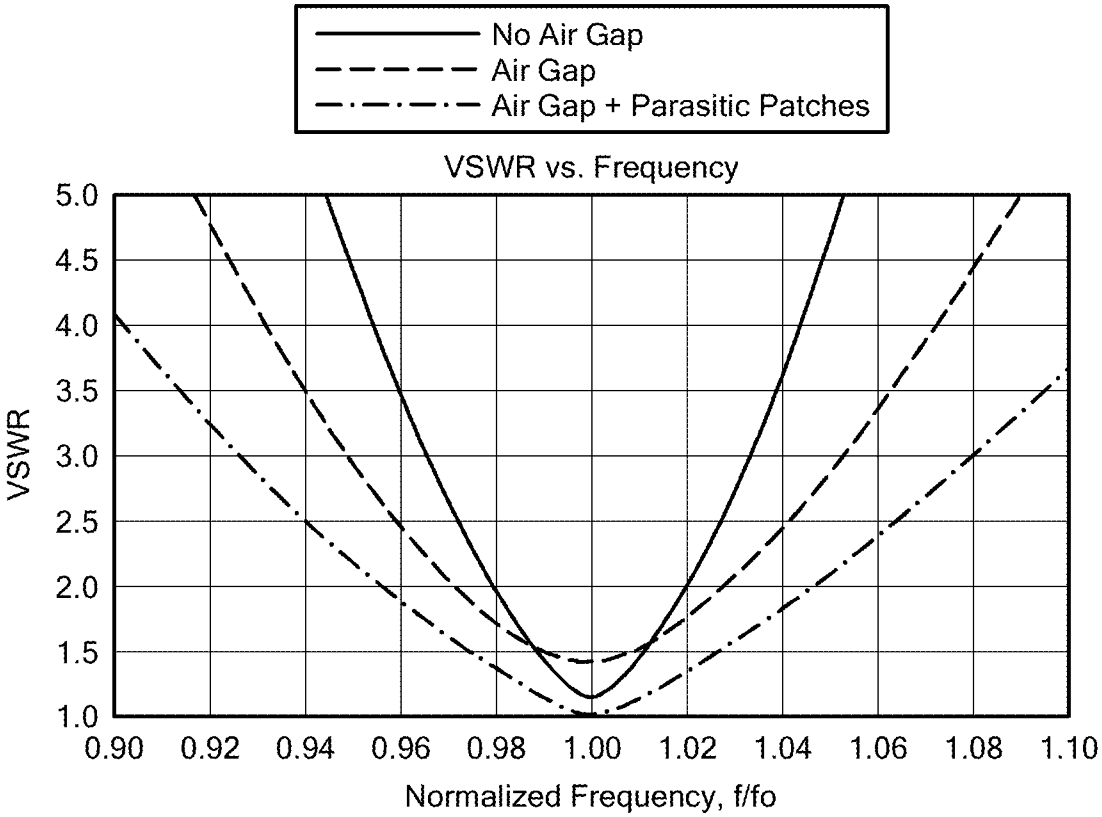
FIG. 3 is an exemplary graph of voltage standing wave ratio (VSWR) versus frequency for the low-profile, circularly-polarized antenna of FIG. 2.
Figure 4:
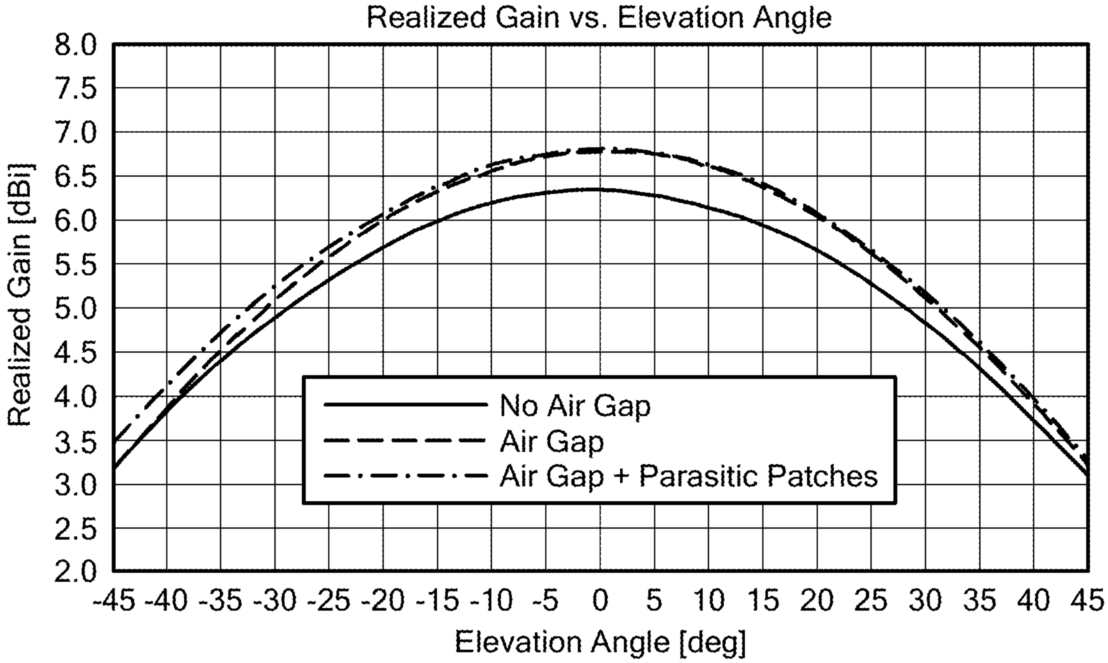
FIG. 4 is an exemplary graph of realized gain versus elevation angle for the low-profile, circularly-polarized antenna of FIG. 2.

FIG. 3 is an exemplary graph of voltage standing wave ratio (VSWR) vs. frequency for the low-profile, circularly-polarized antenna of FIG. 2 and FIG. 4 is an exemplary graph of realized gain versus elevation angle for the low-profile, circularly-polarized antenna of FIG. 2.

In FIGS. 3 and 4, three exemplary antenna assemblies (e.g., antenna assemblies with no air gap, an air gap, and an air gap and a parasitic patch element) were modeled using a finite element modeling (FEM) modeler to predict performance. The antenna assembly with no air gap was used as a reference. The exemplary antenna assembly had a stack height of ~150 mil of PCB dielectric material (e.g., Rogers RT/Duroid® 6002 laminates). The use of an air gap improves the 2:1 VSWR impedance bandwidth by 38% and the realized gain by 10%. The use of an air gap and parasitic patches improves the 2:1 VSWR impedance bandwidth by 127% and the realized gain by 11%.

Figure 5:
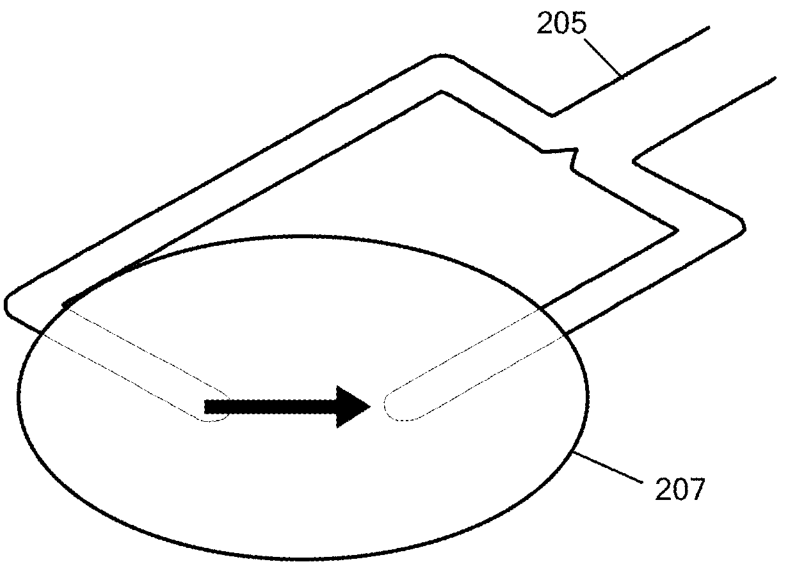
FIG. 5 is an illustration of a patch antenna element and a power divider of the low-profile, circularly-polarized antenna of FIG. 2.

FIG. 5 is an illustration of the patch antenna element 207 and the power divider 205 of the low-profile, circularly-polarized antenna of FIG. 2. In the exemplary embodiment, the power divider 205 divides the microstrip feed line 203 of FIG. 2 into two microstrip feed lines below and proximity coupled to the patch antenna element 207, where the two microstrip feed lines are approximately ±90 out of phase, which induces circular polarization of the patch antenna element 207. A phase difference of approximately +90 degrees between the two microstrip feed lines is commonly referred to as right-hand (RH) polarization. A phase difference of approximately −90 degrees between the two microstrip feed lines is commonly referred to as left-hand (LH) polarization.

Figure 6:
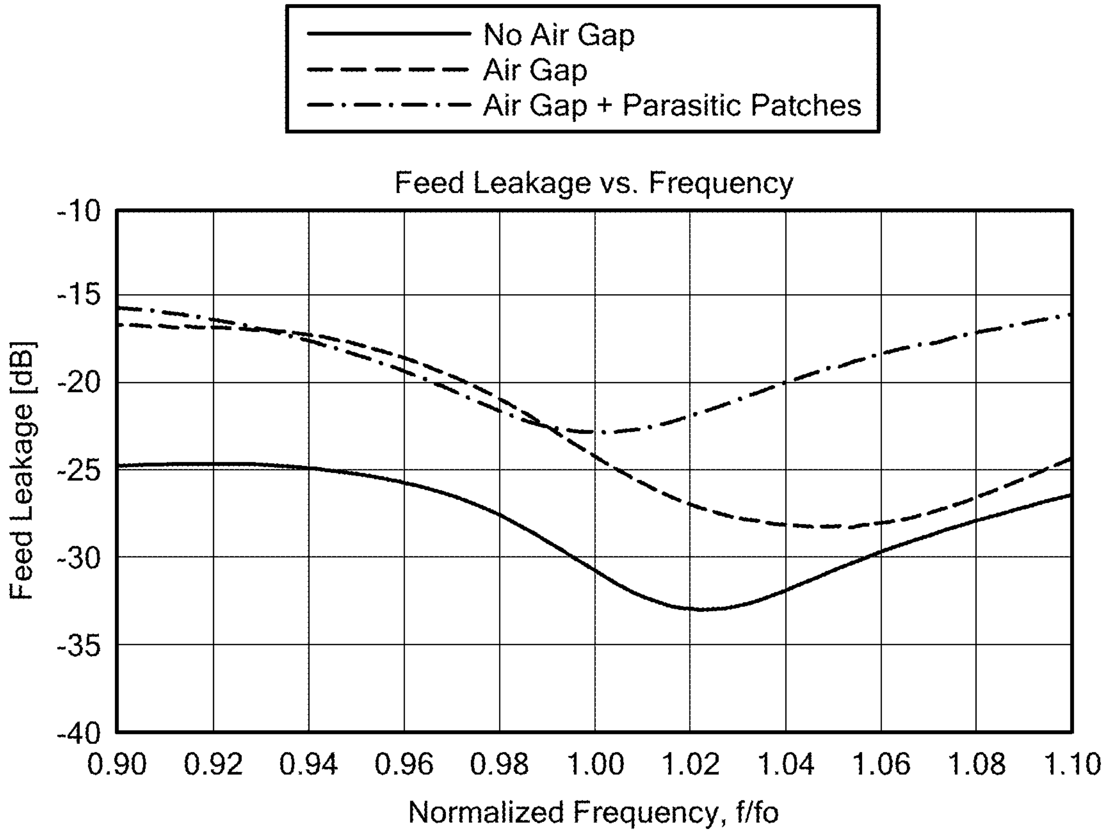
FIG. 6 is an exemplary graph of feed leakage versus frequency for the low-profile, circularly-polarized antenna of FIG. 5.

FIG. 6 is an exemplary graph of feed leakage versus frequency for the low-profile, circularly-polarized antenna of FIG. 6. In FIG. 6, three exemplary antenna assemblies (e.g., antenna assemblies with no air gap, an air gap, and an air gap and a parasitic patch element) were modeled using a finite element modeling (FEM) modeler to predict performance. The antenna assemblies all have feed leakages better than 22 dB (or approximately 0.6% power leaked from one microstrip feed line to the other) near the operating frequency.

Figure 7:
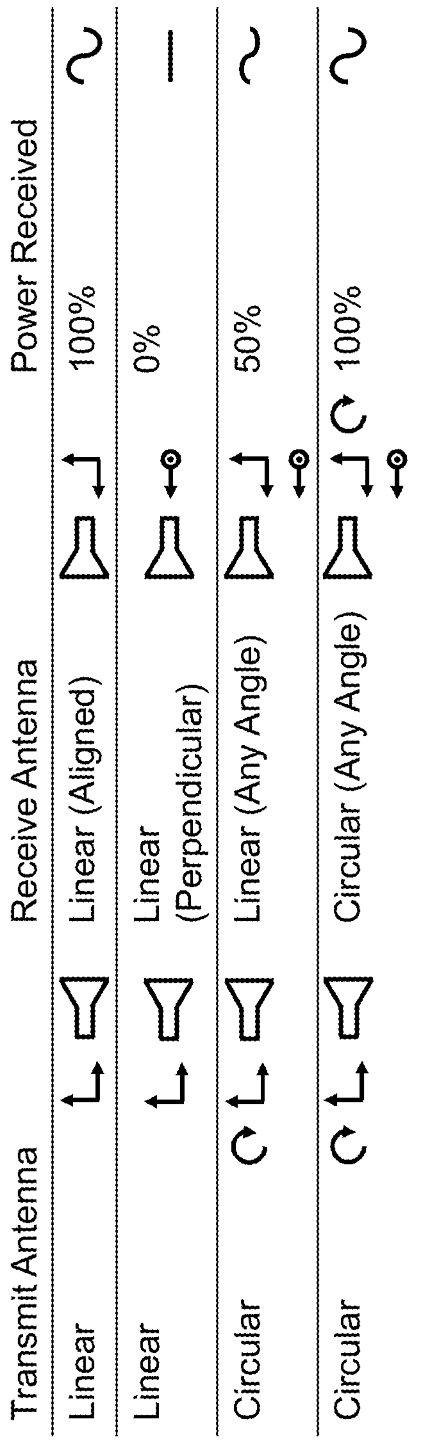
FIG. 7 is an exemplary chart of transmit antenna types, receive antenna types, and power received thereby.

FIG. 7 is an exemplary chart of transmit antenna types, receive antenna types, and power received thereby. Antennas are classified as linearly polarized (e.g., axial ratio>>3 dB) and circularly polarized (e.g., axial ratio<3 dB). Misalignment of two linearly-polarized antennas may result in no power transfer. The use of at least one circularly-polarized antenna ensures that at least 50% of power is always transferred for any alignment (angle).

Figure 8:
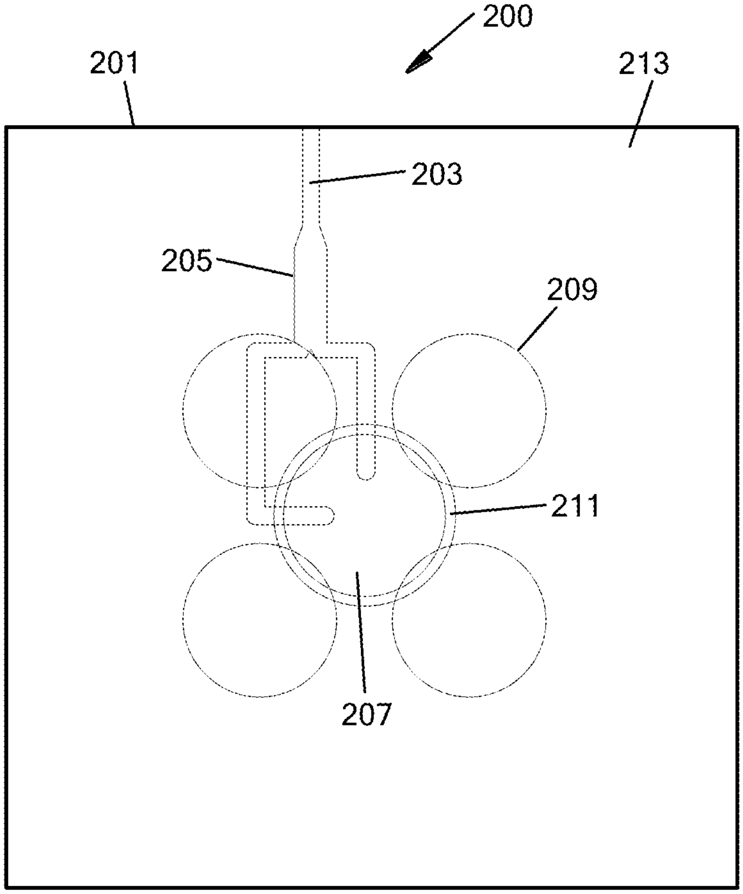
FIG. 8 is a top view of the low-profile, circularly-polarized antenna of FIG. 2.

FIG. 8 is a top view of the low-profile, circularly-polarized antenna 200 of FIG. 2. In the exemplary embodiment, the low-profile, circularly-polarized antenna 200 comprises the radome 201 formed from a first dielectric material, the at least one parasitic patch element 209 formed on a second dielectric layer below the first dielectric material, the patch antenna element 207 formed on a top side of a third dielectric material below the at least one parasitic patch element 209, the microstrip feed line 203 formed on a bottom side of the third dielectric material below the patch antenna element 207, the power divider 205 formed on the bottom side of the third dielectric material and configured to divide the microstrip feed line 203 into two microstrip feed lines that are approximately ±90 degrees out of phase with each other and proximity-coupled to the patch antenna element 207 to circularly-polarize the patch antenna element 207, the at least one air cavity 211 formed in a fourth dielectric material below the patch antenna element 207, and the electrical ground plane 213 formed on a fifth dielectric material below the fourth dielectric material.

FIG. 8 illustrates four circular parasitic patch elements 209 and one air cavity 211. However, the present disclosure is not limited to four parasitic patch elements, circular parasitic patch elements, or one air cavity.

Figure 9:
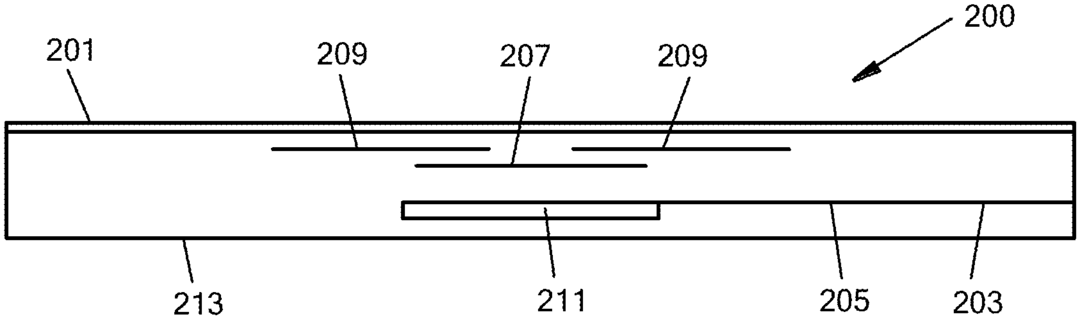
FIG. 9 is a side view of the low-profile, circularly-polarized antenna of FIG. 2.

FIG. 9 is a side view of the low-profile, circularly-polarized antenna 200 of FIG. 2. In the exemplary embodiment, the low-profile, circularly-polarized antenna 200 comprises the radome 201, the at least one parasitic patch element 209, the patch antenna element 207, the microstrip feed line 203, the power divider 205, the at least one air cavity 211, and the electrical ground plane 213.

Figure 10A:
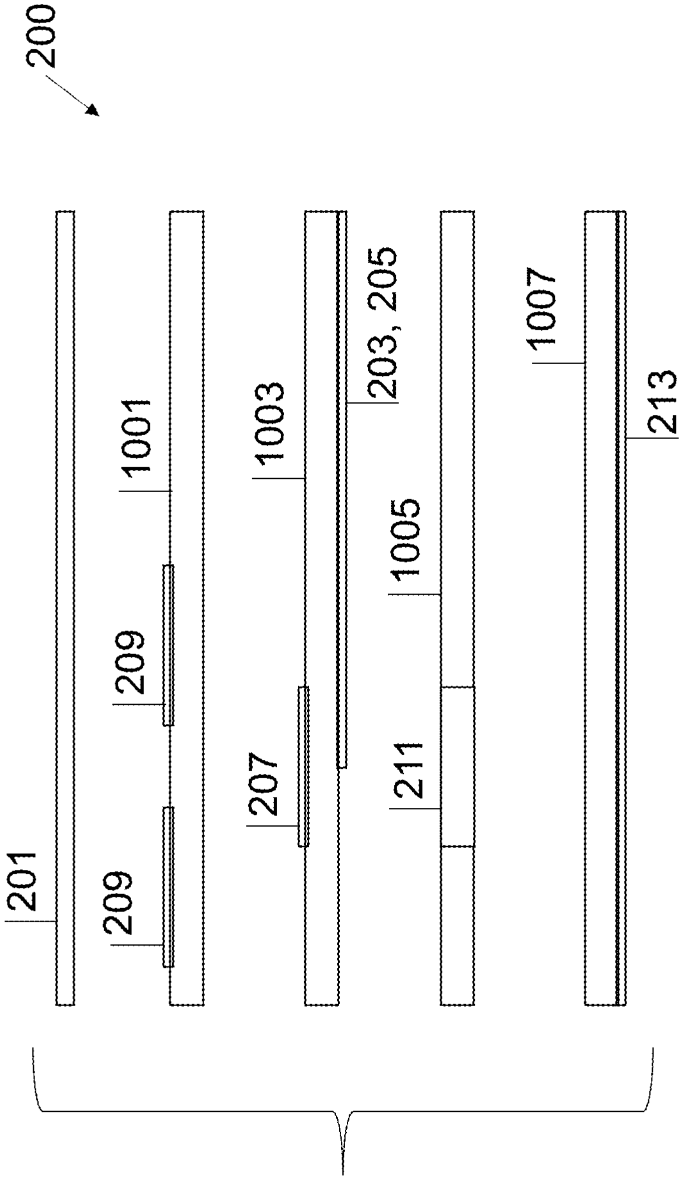
FIG. 10A is an exploded, side view of the low-profile, circularly-polarized antenna of FIG. 2.
Figure 10B:
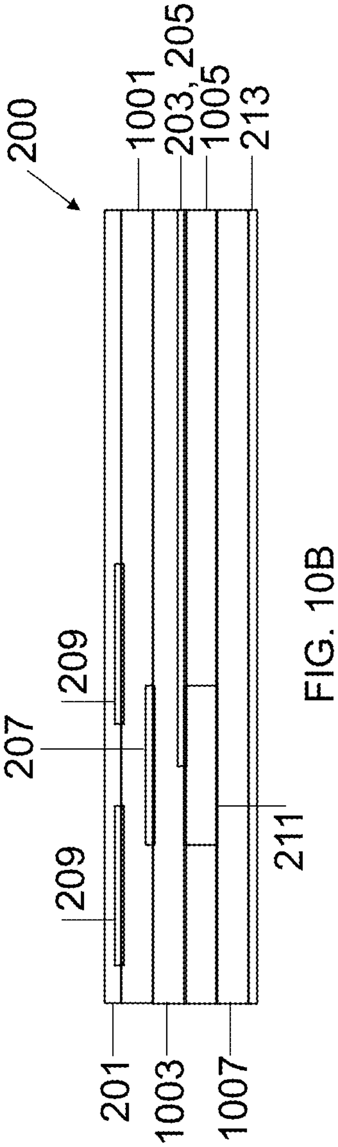
FIG. 10B is a side view of the low-profile, circularly-polarized antenna of FIG. 2.

FIG. 10A is an exploded, side view of the low-profile, circularly-polarized antenna 200 of FIG. 2 and FIG. 10B is a side view of the low-profile, circularly-polarized antenna 200 of FIG. 2. In the exemplary embodiment, the low-profile, circularly-polarized antenna 200 comprises the radome 201 formed by a first dielectric material, a second dielectric material 1001, the at least one parasitic patch element 209, a third dielectric material 1003, the patch antenna element 207, the microstrip feed line 203 and the power divider 205, a fourth dielectric material 1005, the at least one air cavity 211, a fifth dielectric material 1007, and the electrical ground plane 213.

The first dielectric material forms the radome 201. The second dielectric material 1001 is below the first dielectric material and has the at least one parasitic patch element 209 formed thereon. The third dielectric material 1003 is below the second dielectric material 1001 and has the patch antenna element 207 formed on a top side of the third dielectric material 1003 and has the microstrip feed line 203 and the power divider 205 formed on a bottom side of the third dielectric material 1003. The fourth dielectric material 1005 is below the third dielectric material 1003 and has the at least one air cavity 211 formed therein and below the patch antenna element 207. The firth dielectric material 1007 is below the fourth dielectric material 1005 and has the electrical ground plane 213 formed on a bottom side of the fifth dielectric material 1007.

The low-profile, circularly polarized antenna 200 may be fabricated utilizing existing conventional PCB processes, semiconductor processes, or 3D printing processes. Dielectric material (e.g., dielectric substrates) are commercially available with electroplated (or rolled) conductive material (e.g., copper) on one or both sides. In conventional PCB processes the conductive material may be selectively removed using wet etching, milling, or laser etching. The at least one air gap 211 may be formed by laser etching the fourth dielectric material 1005. The first through fifth dielectric materials 201, 1001, 1003, 1005, and 1007 in a PCB process are aligned and bonded with adhesive films to produce the low-profile, circularly-polarized antenna 200.

Figure 11:
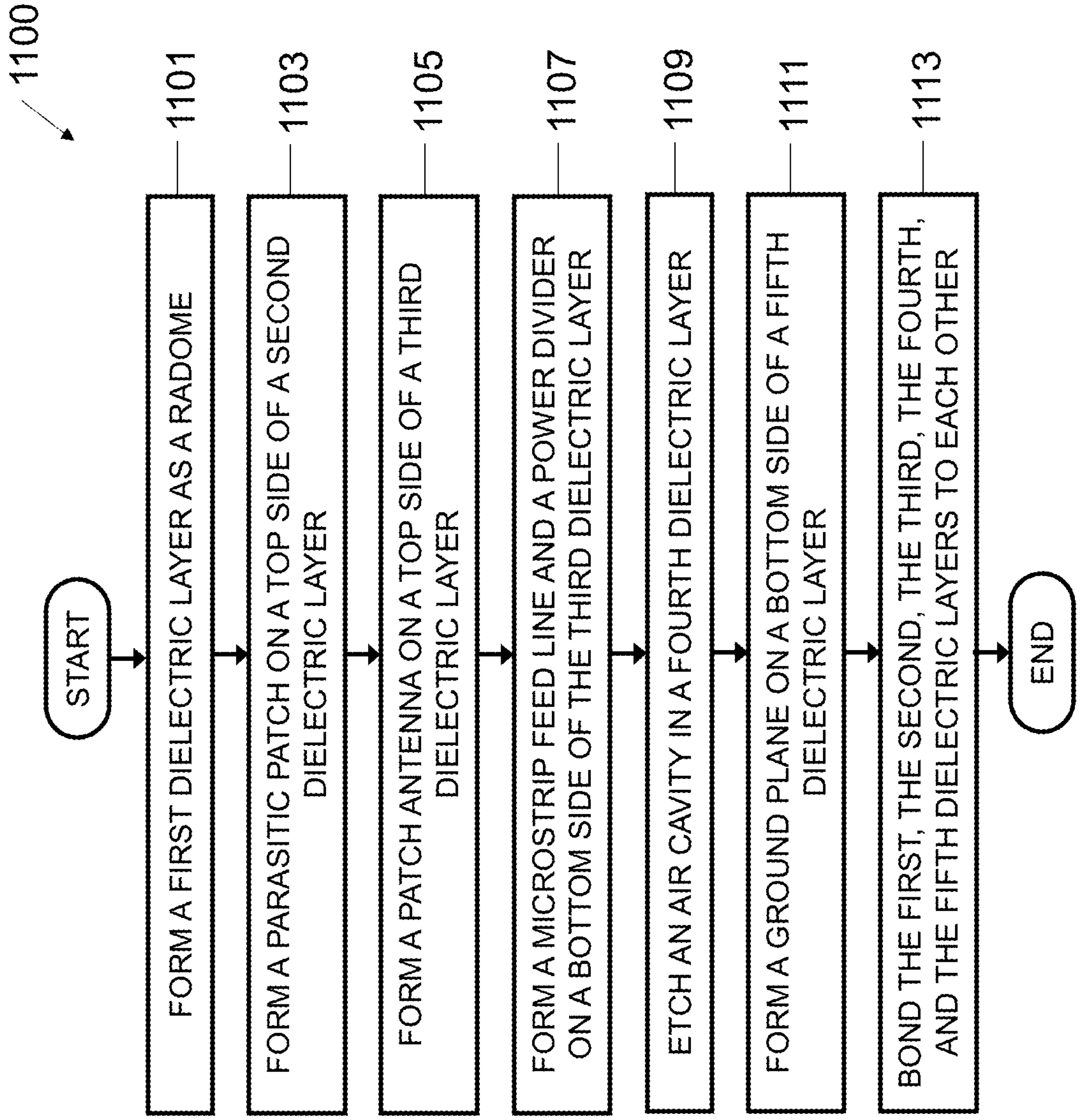
FIG. 11 is an exemplary method of the low-profile, circularly-polarized antenna of FIGS. 10A and 10B.

FIG. 11 is an exemplary method of the low-profile, circularly-polarized antenna 200 of FIGS. 10A and 10B. In the exemplary embodiment, the method 1100 comprises forming a first dielectric layer as a radome in step 1101.

Step 1103 of the method 1100 comprises forming at least one parasitic patch on a top side of a second dielectric layer. Step 1105 comprises forming a patch antenna on a top side of a third dielectric layer. Step 1107 comprises forming a microstrip feed line and a power divider on a bottom side of the third dielectric layer, where the power divider divides the microstrip feed line into two microstrip feed lines that are approximately ±90 degrees out of phase with each other and proximity-coupled to the patch antenna to circularly-polarize the patch antenna. Step 1109 comprises etching at least one air cavity in a fourth dielectric layer, where the at least one air gap is below the patch antenna. Step 1111 comprises forming an electrical ground plane on a bottom side of a fifth dielectric layer. Step 1113 comprises bonding the first through fifth dielectric layers together when a PCB process is used. Step 1113 is not necessary when a semiconductor process or a 3D printing process is used since these processes inherently bond the dielectric layers together during processing.

Figure 12A:
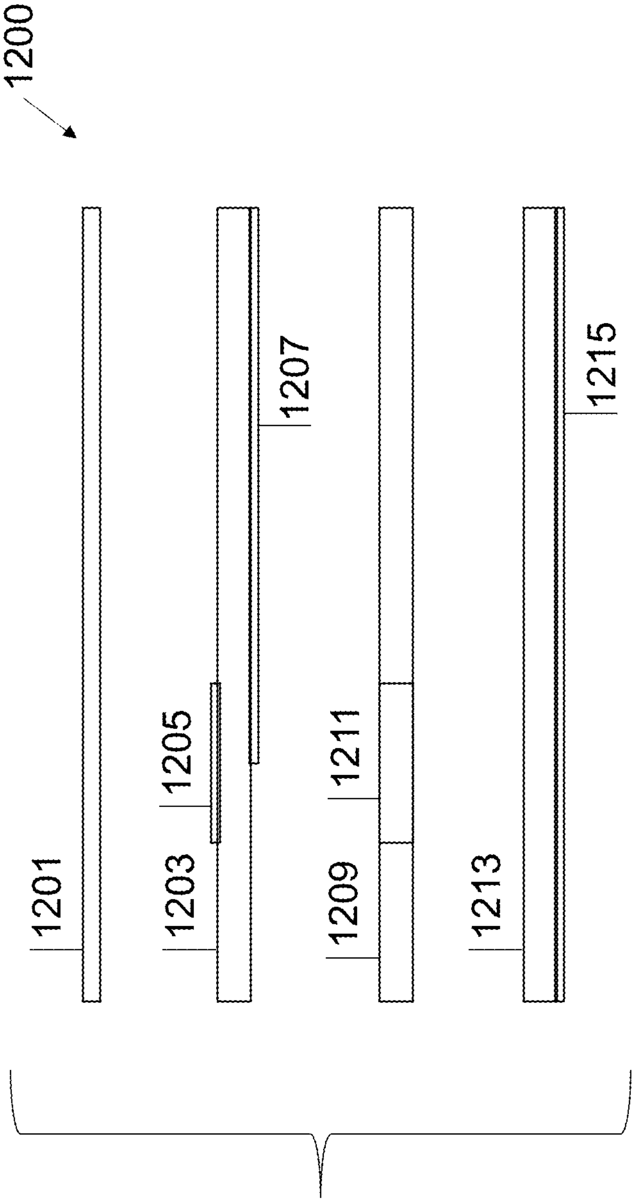
FIG. 12A is an exemplary exploded, side view of a low-profile, circularly-polarized antenna.
Figure 12B:
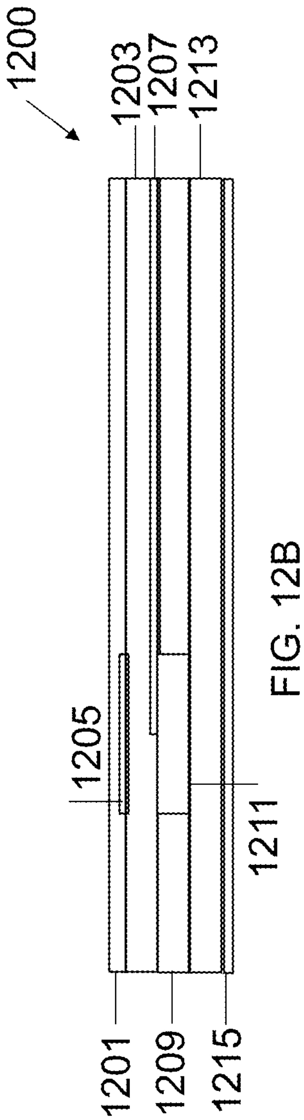
FIG. 12B is a side view of the low-profile, circularly-polarized antenna of FIG. 12A.

FIG. 12A is an exploded, side view of a low-profile, circularly-polarized antenna 1200 and FIG. 12B is a side view of the low-profile, circularly-polarized antenna 1200. In the exemplary embodiment, the low-profile, circularly-polarized antenna 1200 comprises a first dielectric material 1201 comprising a radome, a second dielectric material 1203, a patch antenna element 1205, a microstrip feed line and the power divider 1207, a third dielectric material 1209, at least one air cavity 1211, a fourth dielectric material 1213, and an electrical ground plane 1215. In an exemplary embodiment, the power divider 1207 may be a T-junction power divider, a Wilkinson power divider, or a ±90 degree hybrid coupler.

The first dielectric material 1201 forms the radome. The second dielectric material 1203 is below the first dielectric material 1201 and has the patch antenna element 1205 formed on a top side of the second dielectric material 1203 and has the microstrip feed line and the power divider 1207 formed on a bottom side of the second dielectric material 1203. The third dielectric material 1209 is below the second dielectric material 1203 and has the at least one air cavity 1211 formed therein and below the patch antenna element 1205. The fourth dielectric material 1213 is below the third dielectric material 1209 and has the electrical ground plane 1215 formed on a bottom side of the fourth dielectric material 1213.

The low-profile, circularly polarized antenna 1200 may be fabricated utilizing existing conventional PCB processes, semiconductor processes, or 3D printing processes. Dielectric material (e.g., dielectric substrates) are commercially available with electroplated (or rolled) conductive material (e.g., copper) on one or both sides. In conventional PCB processes the conductive material may be selectively removed using wet etching, milling, or laser etching. The at least one air gap 1211 may be formed by laser etching the third dielectric material 1209. The first through fourth dielectric materials 1201, 1203, 1209, and 1213 in a PCB process are aligned and bonded with adhesive films to produce the low-profile, circularly-polarized antenna 1200. The adhesive film is not necessary when a semiconductor process or a 3D process is used since these processes inherently bond dielectric layers together.

Figure 13:
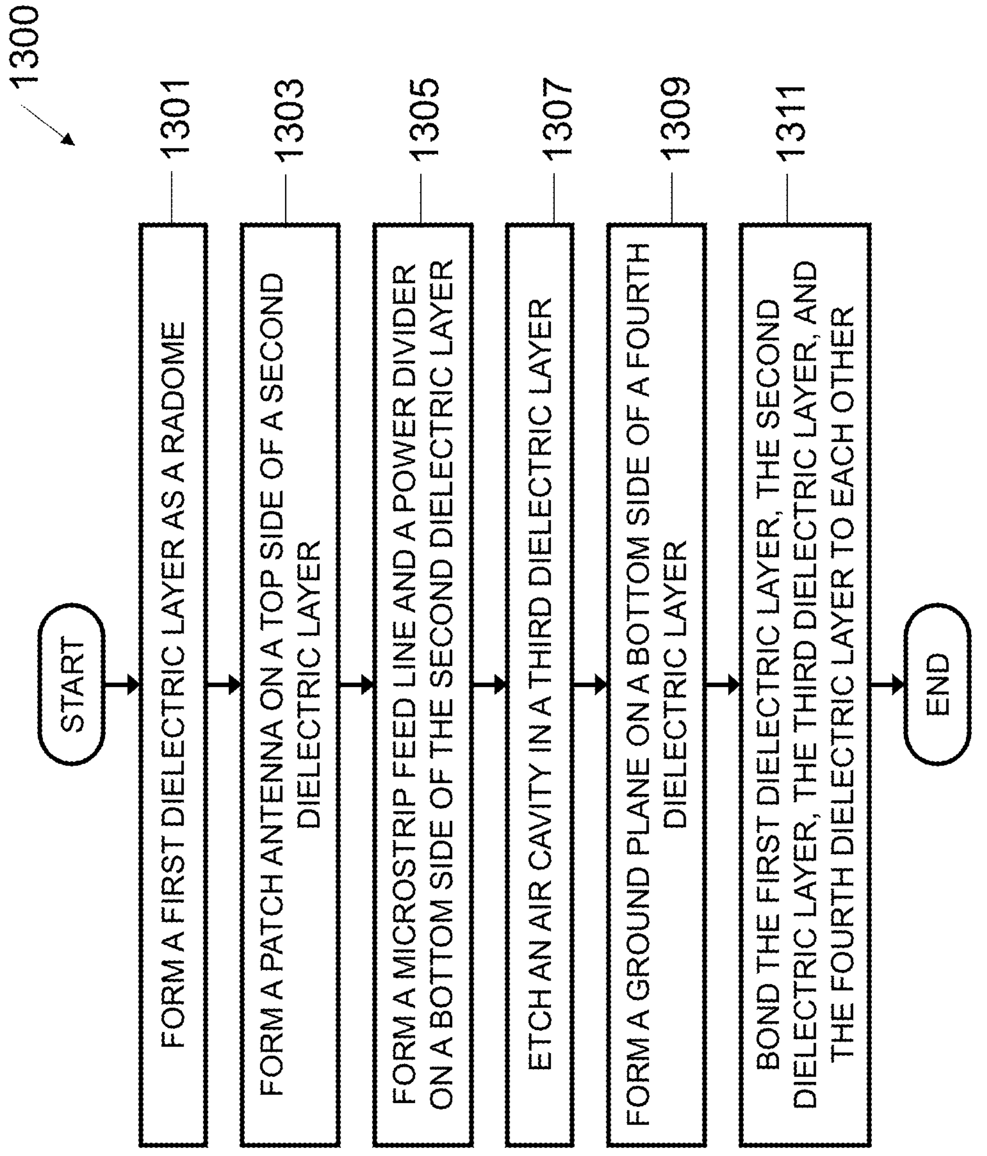
FIG. 13 is an exemplary method of the low-profile, circularly-polarized antenna of FIGS. 12A and 12B.

FIG. 13 is an exemplary method of the low-profile, circularly-polarized antenna of FIGS. 12A and 12B. In the exemplary embodiment, the method 1300 comprises forming a first dielectric layer as a radome in step 1301.

Step 1303 comprises forming a patch antenna on a top side of a second dielectric layer. Step 1305 comprises forming a microstrip feed line and a power divider on a bottom side of the second dielectric layer, where the power divider divides the microstrip feed line into two microstrip feed lines that are approximately ±90 degrees out of phase with each other and proximity-coupled to the patch antenna to circularly-polarize the patch antenna. Step 1307 comprises etching at least one air cavity in a third dielectric layer, where the at least one air gap is below the patch antenna. Step 1309 comprises forming an electrical ground plane on a bottom side of a fourth dielectric layer. Step 1311 comprises bonding the first through fourth dielectric layers together when a PCB process is used. Step 1311 is not necessary when a semiconductor process or a 3D printing process is used since these processes inherently bond the dielectric layers together during processing.

Figure 14:
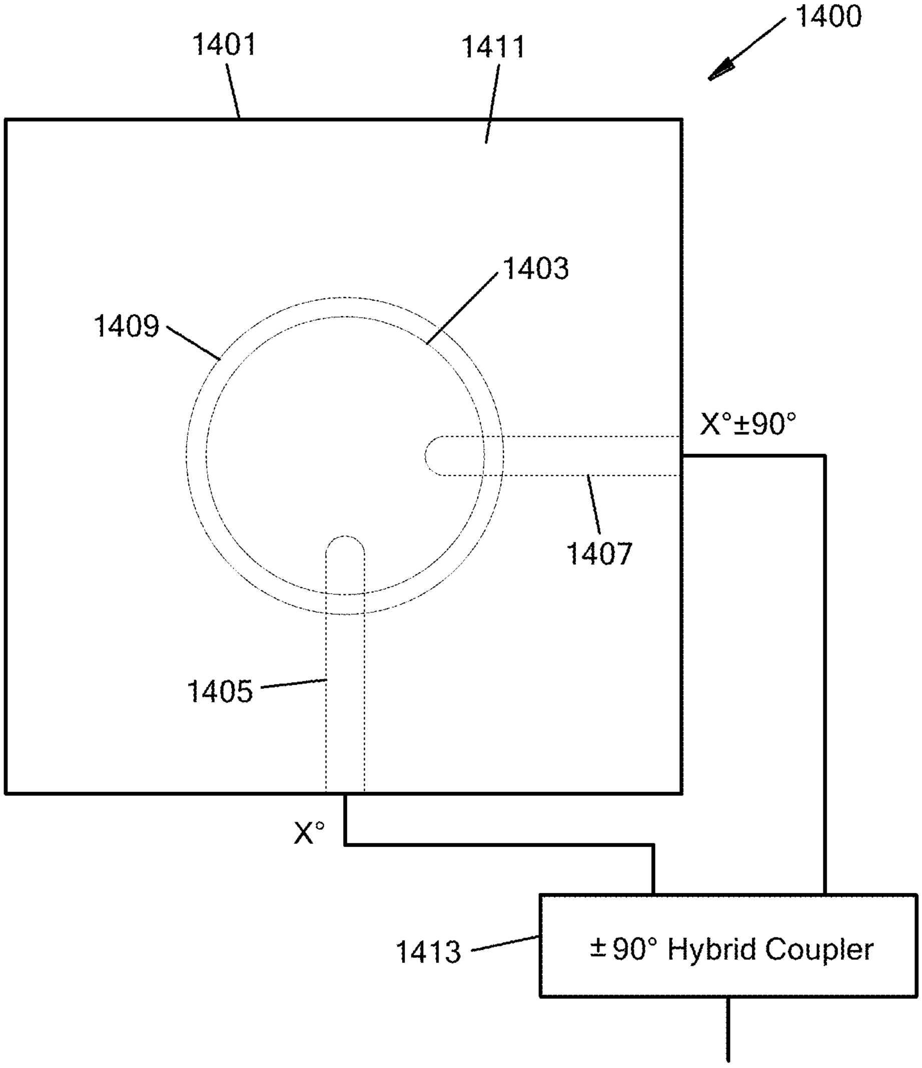
FIG. 14 is an exemplary low-profile, circularly-polarized antenna without parasitic patches.

FIG. 14 is an exemplary low-profile, circularly-polarized antenna 1400 without parasitic patches. In the exemplary embodiment, the low-profile, circularly-polarized antenna 1400 comprises a radome 1401, a patch antenna element 1403, a first microstrip feed line 1405, a second microstrip feed line 1407, at least one air cavity 1409, an electrical ground plane 1411, and a ±90 degree hybrid coupler 1413.

In the exemplary embodiment, the radome 1401 is formed from a first dielectric material. The patch antenna element 1403 is formed on a top side of a second dielectric material and below the first dielectric material. The first microstrip feed line 1405 is formed on a bottom side of the second dielectric material and below the patch antenna element 1403. The second microstrip feed line 1407 is formed on the bottom side of the second dielectric material and below the patch antenna element 1403. The at least one air cavity 1409 is formed in a third dielectric material below the patch antenna element 1403. The electrical ground plane 1411 is formed at a bottom of a fourth dielectric material below the third dielectric material. The ±90 degree hybrid coupler 1413 is external to the radome 1401 and has a first input for receiving an electrical signal, a first output connected to the first microstrip feed line 1405 at a first phase, and a second output connected to the second microstrip feed line 1407 at a phase that is approximately ±90 degree from the phase of the first output, where the first microstrip feed line 1405 and the second microstrip feed line 1407 are proximity-coupled to the patch antenna element 1403 to circularly-polarize the patch antenna element 1403.

FIG. 14 illustrates one air cavity. However, the present disclosure is not limited to one air cavity. In the exemplary embodiment, the dielectric materials may be formed using a PCB process, a semiconductor process, or a 3D printing process. In the PCB process, the first through fifth dielectric materials are bonded to each other using an adhesive. In the semiconductor process and the 3D printing process the first through fifth dielectric materials are inherently bonded to each other by virtue of the semiconductor process and the 3D printing process, respectively.

Figure 15:
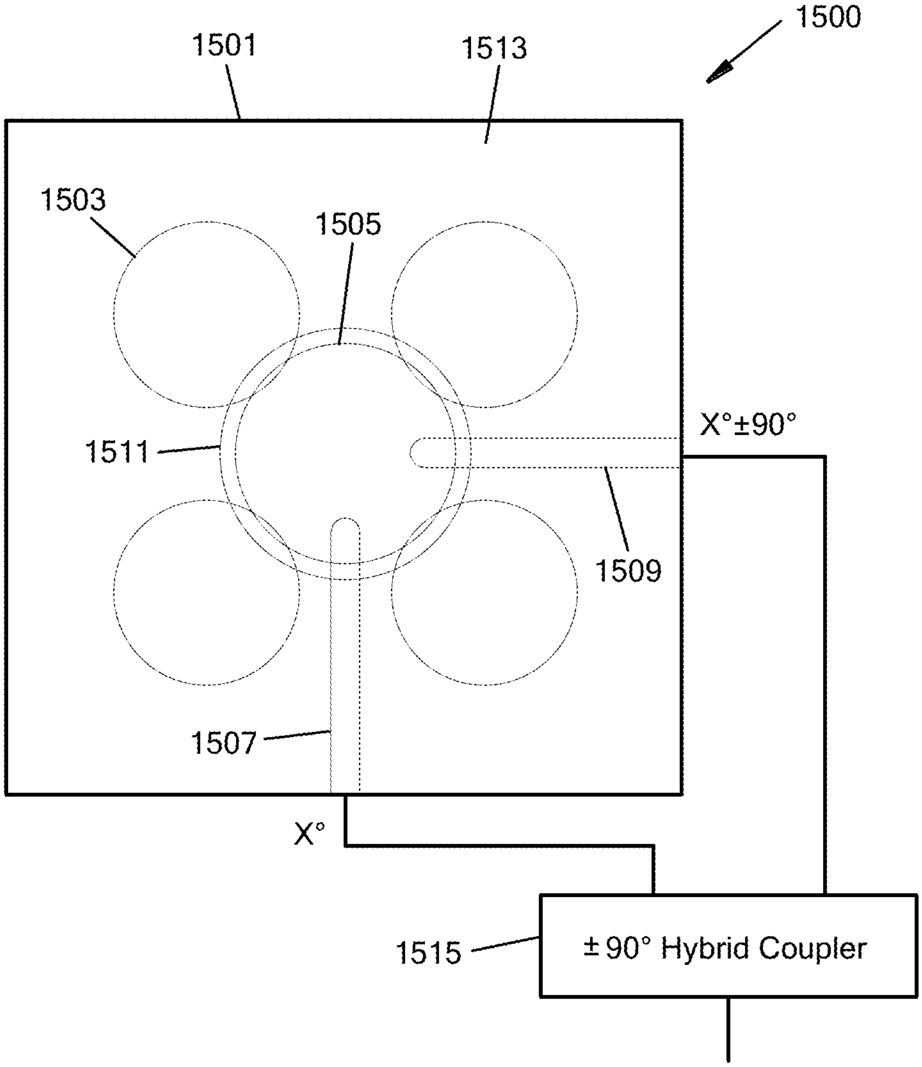
FIG. 15 is an exemplary low-profile, circularly-polarized antenna with parasitic patches.

FIG. 15 is an exemplary low-profile, circularly-polarized antenna 1500 with parasitic patches. In the exemplary embodiment, the low-profile, circularly-polarized antenna 1500 comprises a radome 1501, at least one parasitic patch element 1503, a patch antenna element 1505, a first microstrip feed line 1507, a second microstrip feed line 1509, at least one air cavity 1511, an electrical ground plane 1513, and a ±90 degree hybrid coupler 1515.

In the exemplary embodiment, the radome 1501 is formed from a first dielectric material. The at least one parasitic patch element 1503 is formed on a second dielectric layer below the first dielectric material. FIG. 2 illustrates four circular parasitic patch elements 1503. However, the present disclosure is not limited to four parasitic patch elements 1503 or circular parasitic patch elements. The patch antenna element 1505 is formed on a top side of a third dielectric material and below the second dielectric material. The first microstrip feed line 1507 is formed on a bottom side of the third dielectric material and below the patch antenna element 1505. The second microstrip feed line 1509 is formed on the bottom side of the third dielectric material and below the patch antenna element 1505. The at least one air cavity 1511 is formed in a fourth dielectric material below the patch antenna element 1505. The electrical ground plane 1513 is formed at a bottom of a fifth dielectric material below the fourth dielectric material. The ±90 degree hybrid coupler 1515 is external to the radome 1501 and has a first input for receiving an electrical signal, a first output connected to the first microstrip feed line 1507 at a first phase, and a second output connected to the second microstrip feed line 1509 at a phase that is approximately ±90 degree from the phase of the first output, where the first microstrip feed line 1507 and the second microstrip feed line 1509 are proximity-coupled to the patch antenna element 1505 to circularly-polarize the patch antenna element 1505.

FIG. 15 illustrates one air cavity. However, the present disclosure is not limited to one air cavity. In the exemplary embodiment, the dielectric materials may be formed using a PCB process, a semiconductor process, or a 3D printing process. In the PCB process, the first through fifth dielectric materials are bonded to each other using an adhesive. In the semiconductor process and the 3D printing process the first through fifth dielectric materials are inherently bonded to each other by virtue of the semiconductor process and the 3D printing process, respectively.

Figure 16:
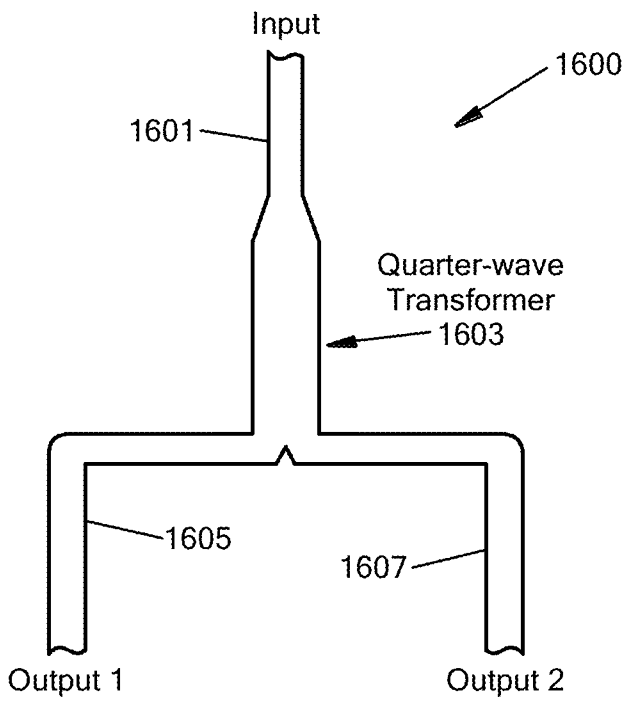
FIG. 16 is an exemplary T-junction power divider.

FIG. 16 is an exemplary T-junction power divider 1600. In the exemplary embodiment, the T-junction power divider 1600 comprises an input microstrip feed line 1601, a quarter-wave transformer 1603, a first output 1605 at a first phase, and a second output 1607 at a phase that is approximately ±90 degrees out of phase with respect to the first output 1605.

Figure 17:
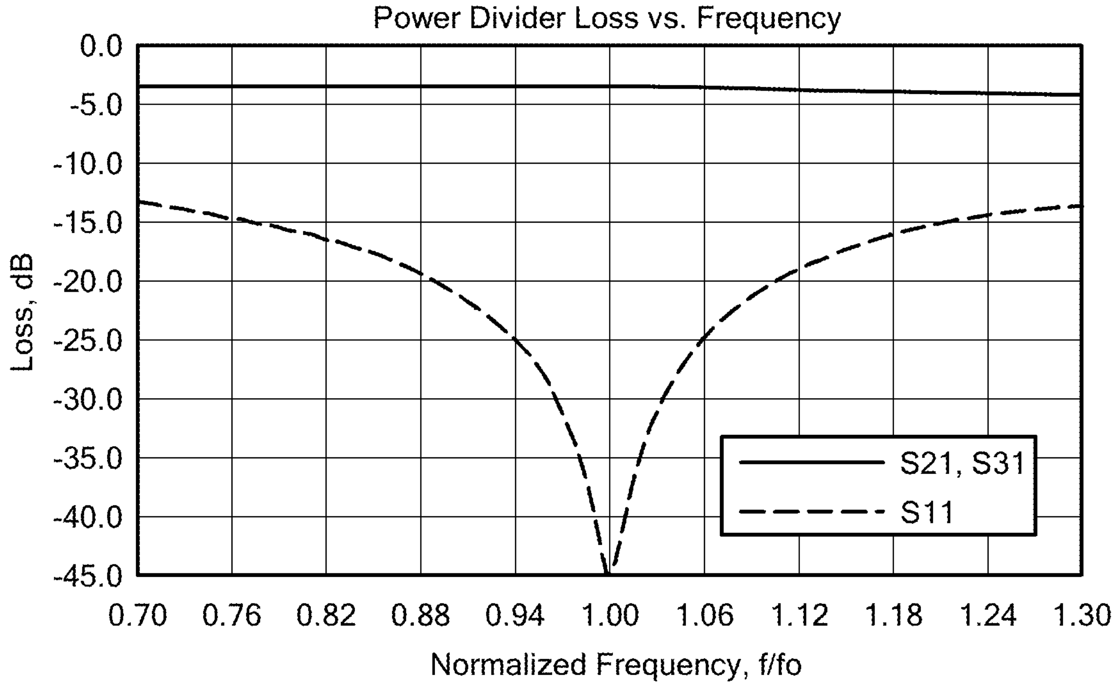
FIG. 17 is an exemplary chart of power divider loss versus frequency.

FIG. 17 is an exemplary chart of power divider loss versus frequency for the T-junction power divider 1600 of FIG. 16.

Figure 18:
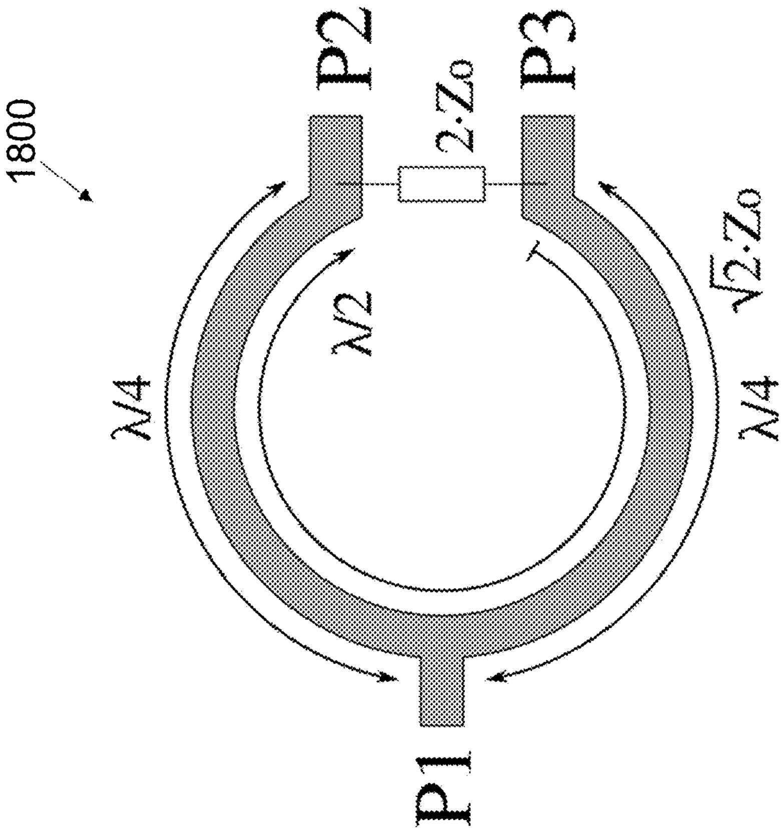
FIG. 18 is an exemplary Wilkinson power divider.

FIG. 18 is an exemplary Wilkinson power divider 1800.

Figure 19:
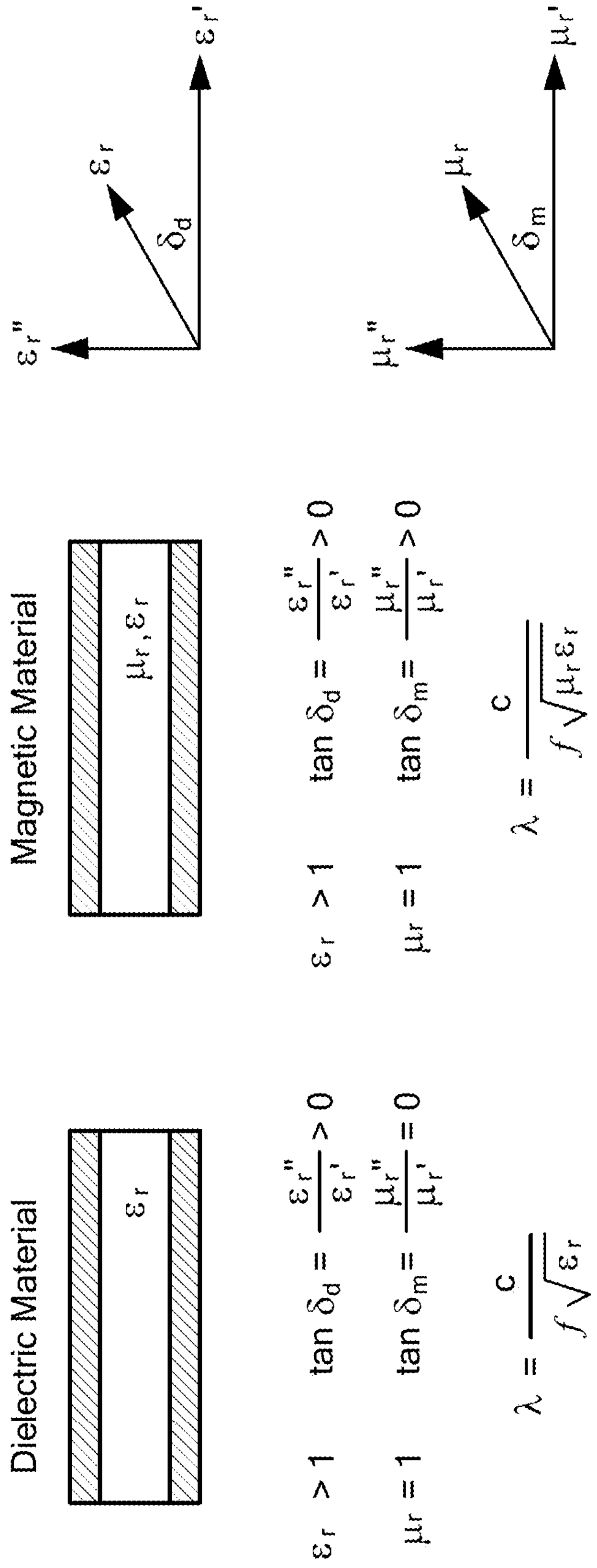
FIG. 19 is an exemplary comparison between magnetic material and dielectric material.

FIG. 19 is an exemplary comparison between magnetic material and dielectric material. In the exemplary comparison, a purely dielectric material has no magnetic properties (i.e., $\mu_r=1$) and has a wavelength (λ) limited by the permittivity of the material ($\varepsilon_r$). A magnetic material, on the other hand, has both dielectric properties ($\varepsilon_r>1$) and magnetic properties ($\mu_r>1$) that significantly reduce the wavelength (λ). However, magnetic materials are typically limited (in frequency) by their magnetic loss tangent (tan $\delta_m$). For example, MAGTREX® 555 high impedance laminate is a commercially available magnetic material with a permeability-permittivity product equivalent of ~30 (up to ~500 MHz).

Figure 20:
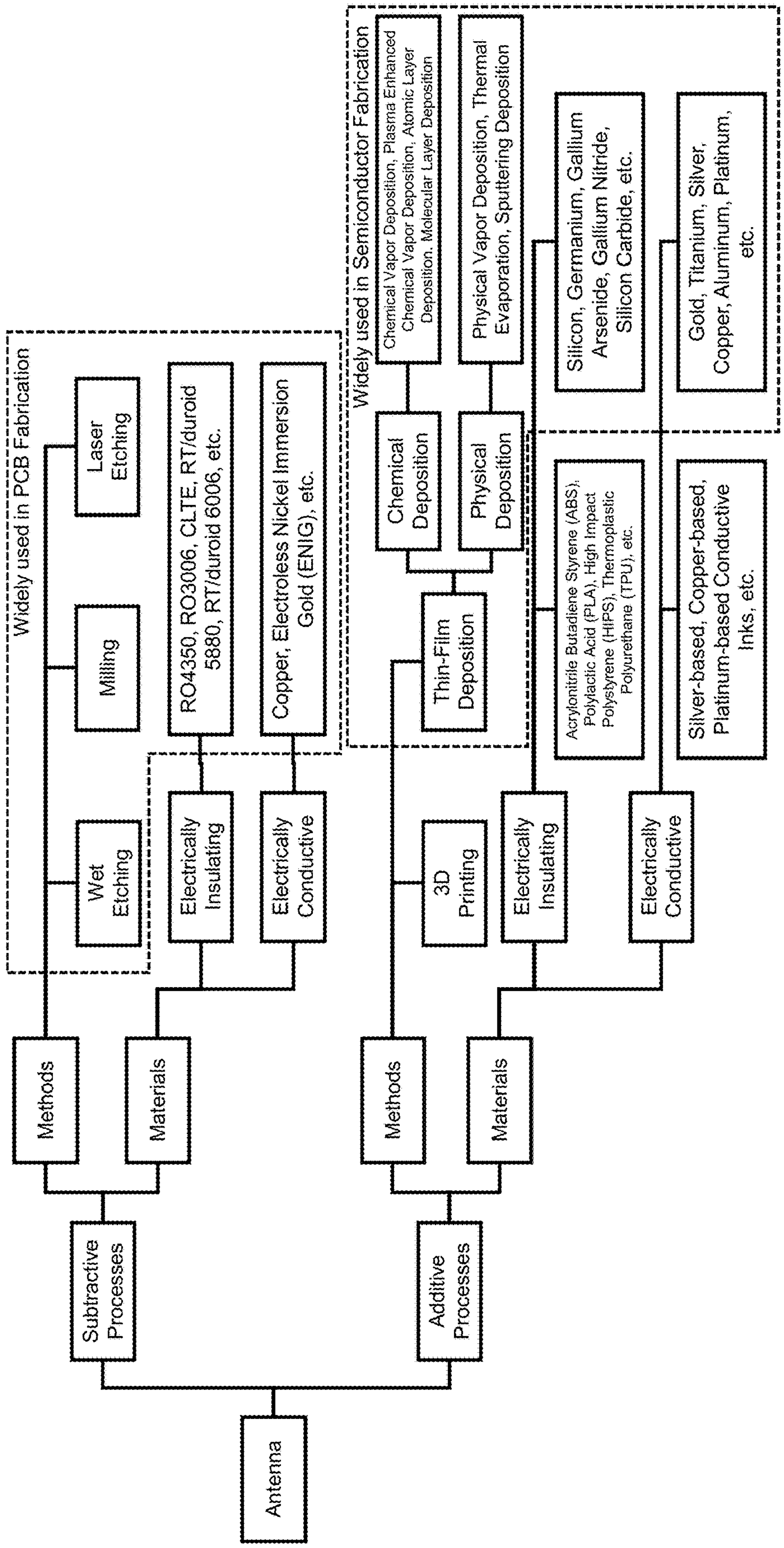
FIG. 20 is an exemplary chart of methods of fabricating an antenna.

FIG. 20 is an exemplary chart of methods of fabricating an antenna. In the exemplary chart, an antenna may be fabricated by a subtractive process or an additive process. The subtractive process may use methods that comprise wet etching, milling, and laser etching, which are used in PCB fabrication. The subtractive process may use materials comprising electrically insulating materials (e.g., Rogers Corp. RO4350™ laminate material, Rogers Corp. RO3006™ laminate material, coefficient of linear thermal expansion (CLTE™) laminate material, Rogers Corp. RT/Duroid® 5880 laminate material, Rogers Corp. RT/Duroid® 6006 laminate material, etc.) or electrically conductive materials (e.g., copper, electroless nickel immersion gold (ENIG), etc.).

The additive process may use methods that comprise 3D printing and thin-film deposition, which is used in semiconductor fabrication, where thin-film deposition may be achieved by chemical deposition or physical deposition. Chemical deposition may include chemical vapor deposition, plasma enhanced chemical vapor deposition, atomic layer deposition, molecular layer deposition, and so on. Physical deposition may include physical vapor deposition, thermal evaporation, sputtering deposition, and so on. The additive process may use materials comprising electrically insulating materials (e.g., acrylonitrile, butadiene styrene (ABS), polylactic acid (PLA), high impact polystyrene (HIPS), thermoplastic polyurethane (TPU), etc. and semiconductor materials including Silicon, Germanium, Gallium Arsenide, Gallium Nitride, Silicon Carbide, etc.) or electrically conductive materials (e.g., silver-based conductive ink, copper-based conductive ink, platinum-based conductive ink etc. and semiconductor materials including Gold, Titanium, Silver, Copper, Aluminum, Platinum, etc.).

Figure 21:
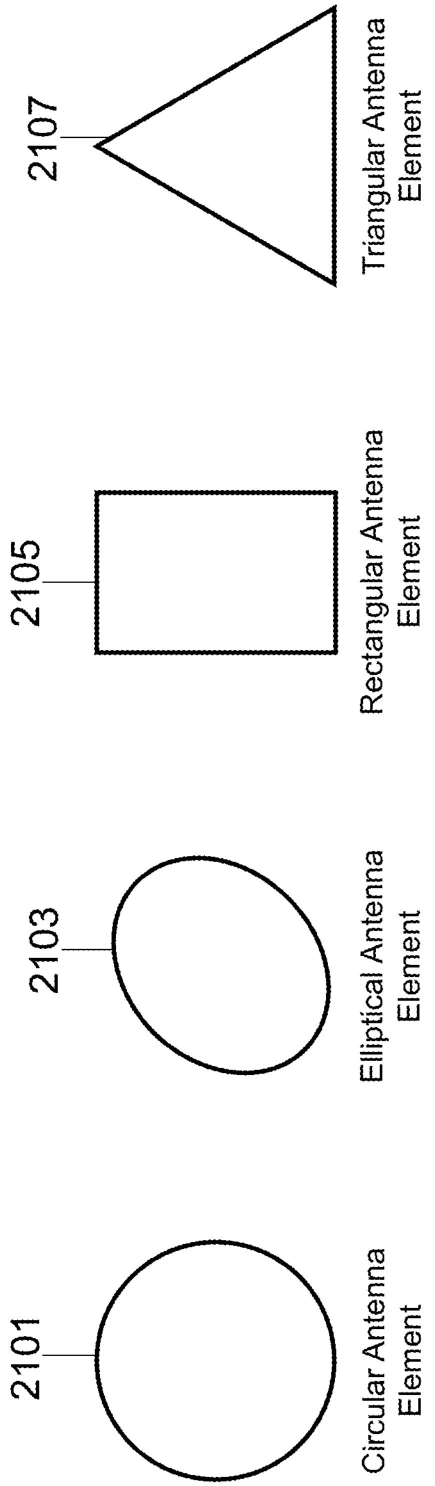
FIG. 21 is an exemplary chart of antenna shapes.

FIG. 21 is an exemplary chart of antenna shapes. In the exemplary chart, antenna shapes comprise circular 2101, elliptical 2103, rectangular 2105, triangular 2107, and so on.

Figure 22:
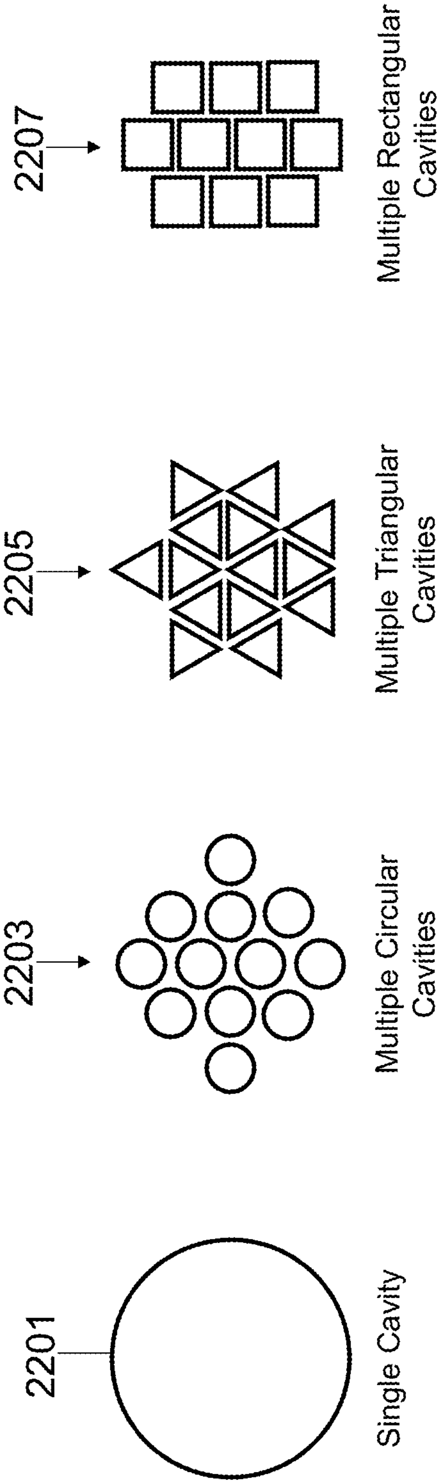
FIG. 22 is an exemplary chart of antenna air cavity shapes and patterns.

FIG. 22 is an exemplary chart of antenna air cavity shapes and patterns. In the exemplary chart, air cavity shapes comprise circular 2201, triangular 2205, rectangular 2207, and so on. Air cavity patterns comprise single cavity 2201, multiple circular cavities 2203, multiple triangular cavities 2205, multiple rectangular cavities 2207, and so on.

Figure 23:
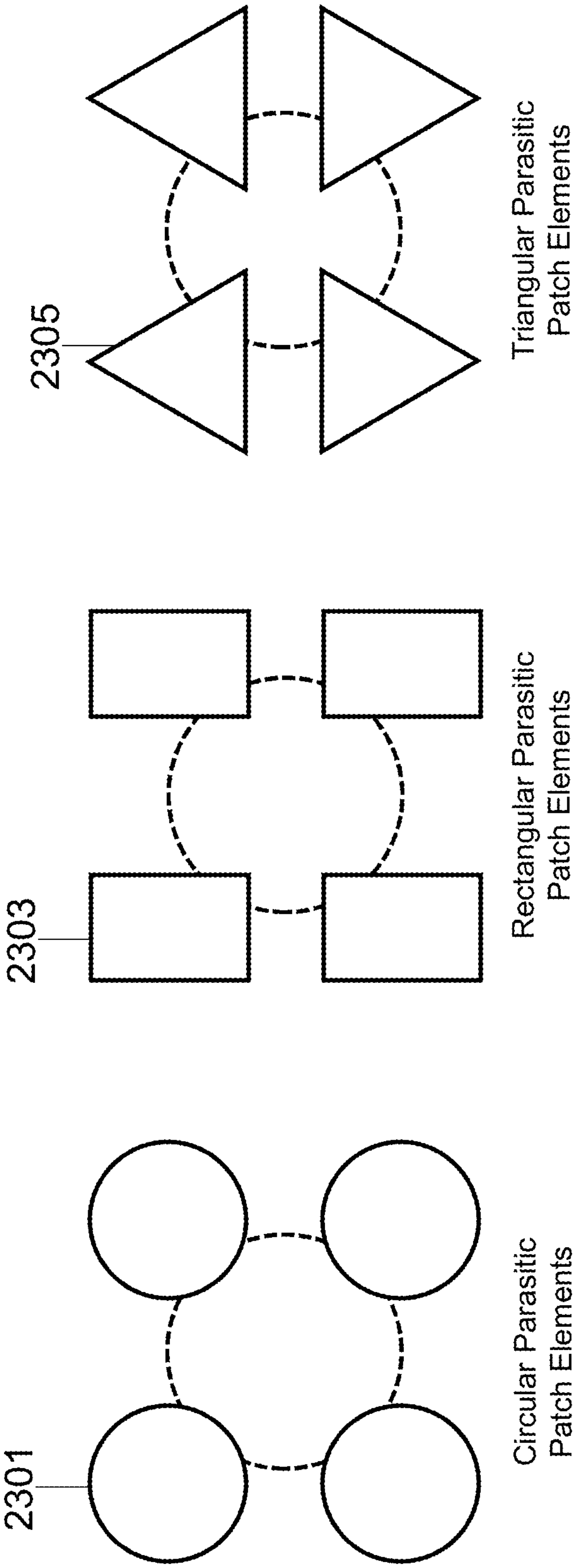
FIG. 23 is an exemplary chart of parasitic patch shapes.

FIG. 23 is an exemplary chart of parasitic patch shapes. In the exemplary chart, parasitic patch shapes comprise circular parasitic patch elements 2301, rectangular parasitic patch elements 2303, triangular parasitic patch elements 2305, and so on.

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable sub combination. Other embodiments not specifically described herein are also within the scope of the following claims.

Various embodiments of the concepts, systems, devices, structures and techniques sought to be protected are described herein with reference to the related drawings. As noted above, in embodiments, the concepts and features described herein may be embodied in a digital multi-beam beamforming system. Alternative embodiments can be devised without departing from the scope of the concepts, systems, devices, structures and techniques described herein.

It is noted that various connections and positional relationships (e.g., over, below, adjacent, etc.) are set forth between elements in the above description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection".

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description herein, terms such as "upper," "lower," "right," "left," "vertical," "horizontal, "top," "bottom," (to name but a few examples) and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements. Such terms are sometimes referred to as directional or positional terms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways.

Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. An antenna, comprising:

a first semiconductor substrate having a first side and an opposing second side;

an antenna element on the first side of the first semiconductor substrate;

a microstrip feed line on the second side of the first semiconductor substrate;

a power divider on the second side of the first semiconductor substrate connected to the microstrip feed line, wherein the power divider is configured to divide an input from the microstrip feed line into first and second outputs that are ±90 degrees out of phase with each other;

a first conductor on the second side of the first semiconductor substrate proximity coupled to the antenna element and configured to receive the first output from the power divider;

a second conductor on the second side of the first semiconductor substrate proximity coupled to the antenna element and configured to receive the second output from the power divider, the first conductor and the second conductor collectively configured to circularly polarize the antenna element based on the first and second outputs;

a second semiconductor substrate under the first semiconductor substrate having at least one air gap therein under the antenna element;

a third semiconductor substrate under the second semiconductor substrate having a first side and a second side;

an electrical ground plane on the second side of the third semiconductor substrate;

a fourth semiconductor substrate above the first semiconductor substrate having a first side and an opposing second side; and at least one parasitic patch element on the first side of the fourth semiconductor substrate and above the antenna element.

2. The antenna of claim 1, wherein the first semiconductor substrate, the second semiconductor substrate, and the third semiconductor substrate are each a dielectric material and/or a magnetic material.

3. The antenna of claim 1, wherein the power divider comprises a T-junction power divider, a Wilkinson power divider, a +90 degree hybrid coupler, and/or a −90 degree hybrid coupler.

4. The antenna of claim 1, further comprising a fifth semiconductor substrate over the first semiconductor substrate as a radome.

5. The antenna of claim 1, wherein the antenna element has a shape of a circle, an ellipse, a rectangle, and/or a triangle.

6. The antenna of claim 1, wherein each of the at least one air gap has a shape of a circle, a triangle, and/or a rectangle; and wherein the at least one air gap is arranged in a pattern of a plurality of circles, a plurality of triangles, and/or a plurality of rectangles.

7. The antenna of claim 1, wherein each of the at least one parasitic patch element has a shape of a circle, a rectangle, and/or a triangle, and wherein the at least one parasitic patch element is arranged in a shape of a plurality of circles, a plurality of triangles, and/or a plurality of rectangles.

8. A method of fabricating an antenna, comprising:

forming a first semiconductor substrate having a first side and an opposing second side;

forming an antenna element on the first side of the first semiconductor substrate;

forming a microstrip feed line on the second side of the first semiconductor substrate;

forming a power divider on the second side of the first semiconductor substrate connected to the microstrip feed line, wherein the power divider is configured to divide an input from the microstrip feed line into first and second outputs that are ±90 degrees out of phase with each other;

forming a first conductor on the second side of the first semiconductor substrate proximity coupled to the antenna element and configured to receive the first output from the power divider;

forming a second conductor on the second side of the first semiconductor substrate proximity coupled to the antenna element and configured to receive the second output from the power divider, the first conductor and the second conductor collectively configured to circularly polarize the antenna element based on the first and second outputs;

forming a second semiconductor substrate under the first semiconductor substrate having at least one air gap therein under the antenna element;

forming a third semiconductor substrate under the second semiconductor substrate having a first side and a second side;

forming an electrical ground plane on the second side of the third semiconductor substrate;

forming a fourth semiconductor substrate above the first semiconductor substrate having a first side and an opposing second side; and forming at least one parasitic patch element on the first side of the fourth semiconductor substrate and above the antenna element.

9. The method of claim 8, wherein the first semiconductor substrate, the second semiconductor substrate, and the third semiconductor substrate are each a dielectric material and/or a magnetic material.

10. The method of claim 8, wherein the power divider comprises a T-junction power divider, a Wilkinson power divider, a +90 degree hybrid coupler, and/or a −90 degree hybrid coupler.

11. The method of claim 8, further comprising forming a fifth semiconductor substrate over the first semiconductor substrate as a radome.

12. The method of claim 8, wherein the antenna element has a shape of a circle, an ellipse, a rectangle, and/or a triangle.

13. The method of claim 8, wherein each of the at least one air gap has a shape of a circle, a triangle, and/or a rectangle; and wherein the at least one air gap is arranged in a pattern of a plurality of circles, a plurality of triangles, and/or a plurality of rectangles.

14. The method of claim 8, wherein each of the at least one parasitic patch element has a shape of a circle, a rectangle, and/or a triangle, and wherein the at least one parasitic patch element is arranged in a shape of a plurality of circles, a plurality of triangles, and/or a plurality of rectangles.

* * * * *